Figure 3:
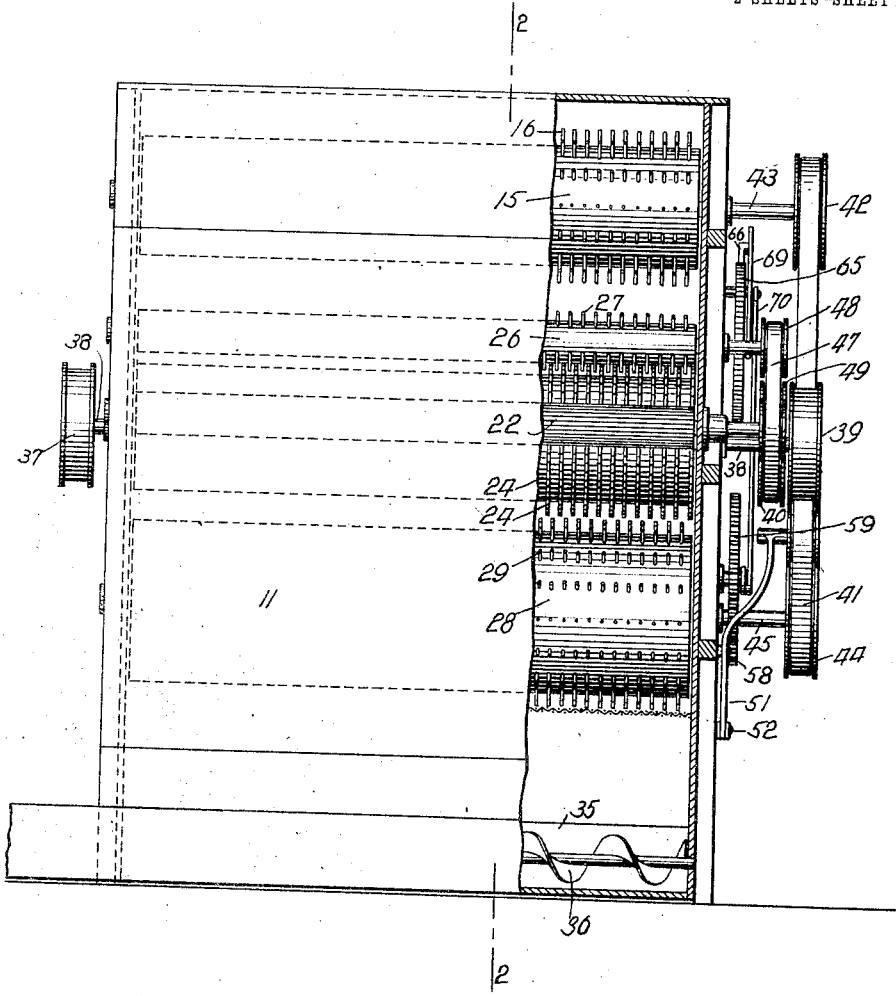

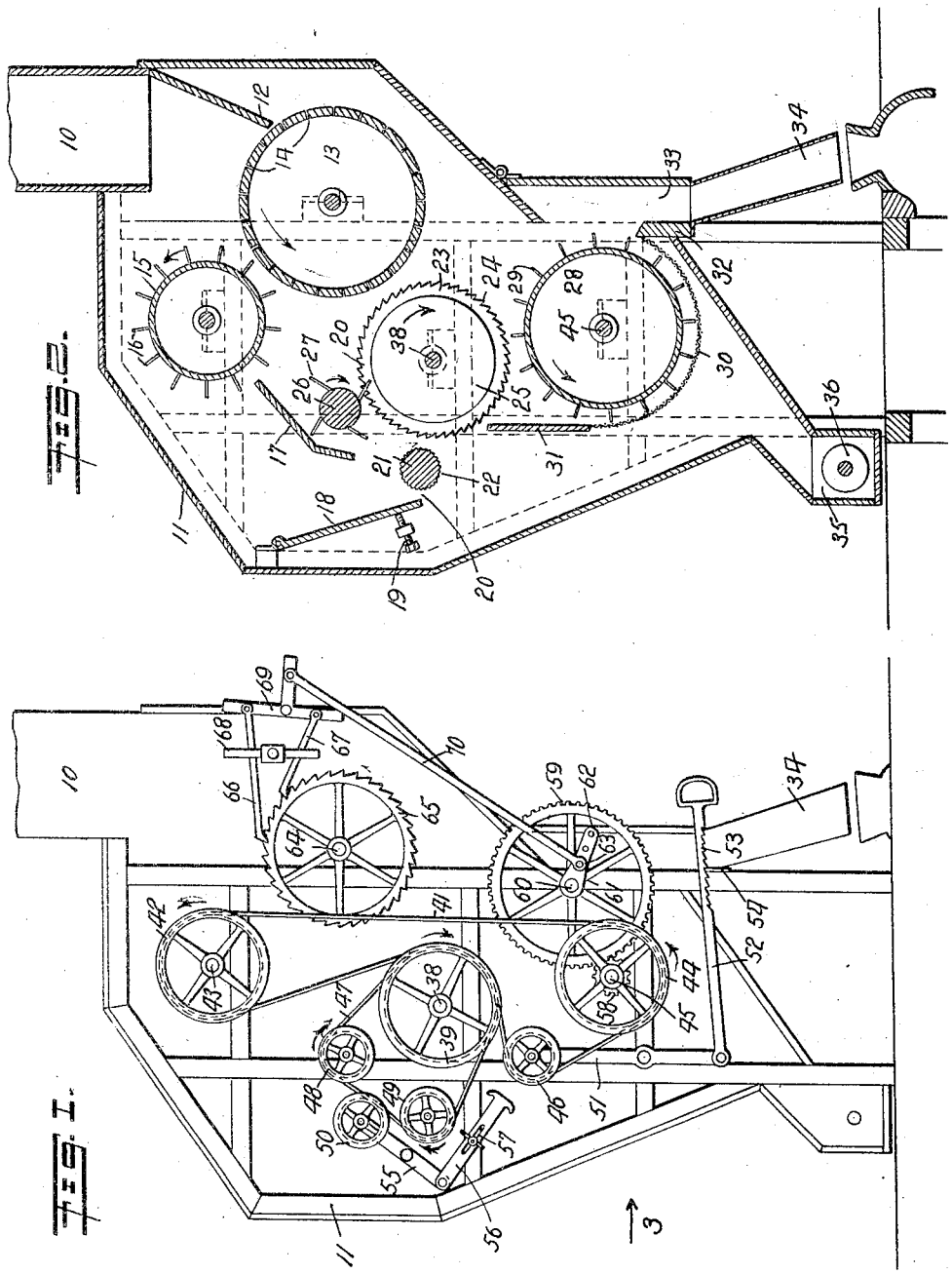

J. F. WOLFINGER.
COTTON HULLER, CLEANER, AND FEEDER.
APPLICATION FILED SEPT. 24, 1912.

1,070,934.

Patented Aug. 19, 1913.

2 SHEETS—SHEET 2.

WITNESSES
G. Robert Thomas
B. Joffe

INVENTOR
JOHN F. WOLFINGER,
BY
ATTORNEYS

UNITED STATES PATENT OFFICE.

JOHN FRANKLIN WOLFINGER, OF BOYNTON, OKLAHOMA.

COTTON HULLER, CLEANER, AND FEEDER.

1,070,934.

Specification of Letters Patent. Patented Aug. 19, 1913.

Application filed September 24, 1912. Serial No. 722,074.

*To all whom it may concern:*

Be it known that I, JOHN F. WOLFINGER, a citizen of the United States, and a resident of Boynton, in the county of Muskogee and State of Oklahoma, have invented a new and Improved Cotton Huller, Cleaner, and Feeder, of which the following is a full, clear, and exact description.

This invention relates to cotton machinery, and an object of the invention is to provide an inexpensive cotton huller, cleaner and feeder, simple in construction and operation that will efficiently and rapidly separate the hulls and foreign substances from cotton so that the cotton is clean when entering the feed to the gin mill.

To carry out the objects above stated I employ a plurality of driven cylinders provided with feeding and disintegrating means on same, or otherwise associated with, and the whole supported and inclosed in a proper casing.

Reference is to be had to the accompanying drawings forming a part of this specification, in which similar characters of reference indicate corresponding parts in all the views.

Figure 1 is a side elevation of an embodiment of my invention; Fig. 2 is a vertical section on line 2—2; and Fig. 3 is a face elevation of the invention with the frame partly cut away.

The machine is mounted on a suitably constructed casing 11 provided with a hopper 10 through which the cotton to be cleaned is fed. A baffle plate 12 is provided under the aperture in the hopper to direct the cotton bolls on a revolving drum 13, which is preferably provided with longitudinal slots 14 on its lateral surface to better grip the cotton bolls and feed the same to a revolving drum 15. The drum 15 is provided on its lateral surface with radially and outwardly projecting pins 16 evenly distributed on the surface and nearly contacting with the surface of drum 13 in the revolving motion, thereby picking up the cotton bolls fed toward said pins by the drum 13 and carrying the bolls in the direction against the advancing material and indicated by the arrow. The cotton bolls picked up by the pins 16 are delivered with force on to the directing plane 17 or against an adjustable baffle plate 18 hinged at the upper end and having adjustable members 19 at its lower end. Near this lower end of the adjustable plate 18 a revoluble drum 21 is provided having a finely corrugated lateral surface 22 and a space 20 formed by the end of plate 18 and the drum 21, which is adjustable by means of the member 19.

Most of the cotton bolls, due to impact with the baffle plate 18 and the directing plane 17, become disintegrated and the loose hulls drop through the space 20 left between the baffle plate 18 and the revolving cylinder 21, as will also the foreign substances, as nails, pebbles, sand and other materials that may be in the cotton, and that become loose during the motion of the cotton. The plane 17, plate 18, and revolving cylinder 21 form a hopper with an adjustable and a fixed opening. The revolving cylinder 21 with the finely corrugated, lateral surface 22 disintegrates also the cotton bolls by rotating the same with its surface against the end of the plate 18 and delivers the seed cotton, together with what bolls were not disintegrated, from the cotton to the saw cylinder 23. The saw cylinder is preferably formed of steel saw disks 24, spaced apart by means of washers 25 of a smaller diameter than the saw disks and concentric with same and mounted on same shaft, the seed cotton being picked up by the disk saws and the cotton bolls carried away by the saw cylinder between the saw disks. A revolving cylinder 26, placed above the saw cylinder, is provided with four rows of pins 27 projecting outwardly from the lateral surface and evenly distributed on same, and making an angle with the tangent to the surface from where the pin projects of 30 degrees. The projecting pins of revolving cylinder 26 are so arranged as to pass between the saw disks 24 without touching the washer 25. In revolving the pins 27 will force any nondisintegrated cotton bolls out of the saw cylinder against the adjustable baffle plate 18 and, consequently, due to the force of the throw, the bolls will become disintegrated and, as above stated the hull will fall through space 20 and the seed cotton delivered again by the surface 22 of cylinder 21 to the saw cylinder 23.

A drum 28 provided with radially, outwardly projecting pins 29 and evenly distributed over its lateral surface, is placed below the saw cylinder. The cotton delivered by the saw is received by the pins 29 of drum 28 and carried in the direction indicated by the arrow. A screen 30, preferably of wire fabric, circles the lower part of drum 28, so that the terminals of the pins of the drum are in close proximity with the curved surface formed by the screen attached to cross-pieces 31 and 32 provided in the frame structure. In consequence of this close proximity of the pins and the screen, the cotton carried by the drum 28, by means of pins 29, is rubbed against the screen and any impurity contained in the cotton and the seed attached to it, is disintegrated and forced through said screen. The cotton, after being rubbed against the screen is carried by the pins 29 toward the chute 33 and then falls into the hopper 34, from where it is fed to the gin mill. The impurities falling through the space 20, between the baffle plate 18 and the roller 21, and the impurities forced through the screen 30, fall into a receptacle 35 in which a conveyer 36 is rotating, forcing the impurities out of the framework.

The lengths of all the cylinders and drums are the same as the space between the walls of the frame 11, and said walls are provided with bearings into which said cylinders and drums are fitted and journaled. All the baffle plates and the directing plane extend through the entire length between the two side walls, and the frame inclosing the whole is provided in certain parts with hinged doors, so as to facilitate the inspection and reparation of parts if required.

The motive power is applied to pulley 37 rigidly attached to one end of shaft 38 of saw cylinder 23 projecting out of the side walls of the frame, and the other end of shaft 38 projecting out of the other side wall, carries two pulleys 39 and 40. A belt 41 passing over pulley 42 placed on a shaft 43 of drum 15, pulley 44 placed on shaft 45 of drum 28 and an idler 46 attached to a tension device, contact with pulley 39 by means of which said belt is driven. Another belt 47 is mounted on pulley 40, passing over pulleys 48 and 49 mounted on shafts of cylinders 26 and 21 respectively. An idler 50 is positioned between pulleys 48 and 49 bearing against the belt 47 and is attached to a tension device. The tension device of idler 46 consists of a lever 51 having at one end the idler 46 and at the other end a lever 52 is fulcrumed intermediate its ends. The lever 52 at one end is provided with a handle and near the handle with teeth 53 engaging a plate 54 fixed in the frame 11; by means of the teeth and plates the tension of belt 41 is adjusted, as can be easily seen from Fig. 1. The other tension device associated with idler 50 consists also of a lever 55, similar to lever 51, and having a lever 56 provided with a slot 57 and a bolt projecting through the slot and attached to the frame and having a nut, so that the tension of the belt 47 is adjusted by placing the lever 56 in the desired position and maintaining same by means of the nut bearing against the lever 56 in the desired position.

The shaft 45 of drum 28 intermediate the pulley 44 and the side wall carries a pinion 58 meshing with a spur gear 59 journaling on shaft 60 attached to the side wall of the frame, as seen in Figs. 1 and 3. A crank arm 61 is rigidly associated with the gear 59 and is provided with a series of openings 62 adapted to receive bolt 63. The shaft 64 of drum 13 projecting through the side wall of the frame is provided with a ratchet wheel 65 engaging two pawls 66 and 67 passed through a guide piece 68 and attached to a pivoted T member 69. The T member is pivoted at the intersection of its branches and intermediate the two pawls on the side wall. A connecting rod 70 connects the free branch of the T member with the crank arm 61 by means of the bolt 63. It can be easily seen that during the rotation of the pulley 39 the pulleys 42 and 44 will rotate in the direction indicated in Fig. 1 and, in consequence, the pinion 58 attached to shaft 45 will rotate in the direction indicated and transmit its motion to spur gear 59 and, in consequence, the crank arm 61 will rotate in the same direction as indicated in drawing 1, and by means of the connecting rod 70 the T member 69 will rock and the pawls 66 and 67 will alternately turn the ratchet wheel 65 and, therefore, the drum 13, and, as above stated, this rotation will feed the cotton toward the drum 15. It can be easily seen from Fig. 1 that by advancing the connecting rod and the extremity of the crank arm 61 a greater displacement of the ratchet wheel 65 may be obtained and, in consequence, the speed of feed of cotton is also increased.

It can be here remarked that the cotton advanced by drum 13 toward the drum 15 is picked up with the pins 16 of drum 15 and there the disintegration of the cotton bolls really begins. The cotton bolls advanced by the pins 16 are thrown against the baffle plate 18 and the directing plane 17, and the extraneous matter contained in the cotton will begin to loosen from the cotton, and coming in contact with the drum 21 revolving in a direction opposite to their motion will only allow the discharge of foreign matters and the seed cotton itself will be thrown against the saw cylinder 23. The cylinder 26 is provided with pins 27 engaging between the saw disks, as above described, and prevents any cotton bolls from passing and will throw same against the baffle plate and disintegrating same. The seed cotton advanced by the saw, as above described, will be again cleaned by the pins 29 of drum 28 rubbing the cotton against the screen 30 so that the cotton will be thoroughly cleaned when entering the gin mill from opening 33 and hopper 34.

While the drum and cylinders can be driven at different speeds, I have found in practice that the preferred speeds for drum 15, saw cylinder 23, and drum 28 are from 175 to 190 R. P. M., and the speeds of the corrugated cylinder 21 and cylinder 26 are from 425 to 475 R. P. M.

Having thus described my invention I claim as new and desire to secure by Letters Patent:—

1. A machine of the class described comprising a hopper having a directing plate to direct the cotton bolls, a revoluble feeding drum having lateral slots associated with said hopper and plate, a ratchet wheel rigidly associated with said feeding drum, and means associated with said ratchet wheel whereby said drum is revolved adjustably and intermittently.

2. A machine of the class described comprising a hopper having a directing plate to direct the cotton bolls, a revoluble feeding drum having lateral slots associated with said hopper and plate, a ratchet wheel rigidly associated with said feeding drum, pawls adapted to engage said ratchet wheel, a T member associated with said pawls, a connecting-rod associated with said T member, and means associated with said connecting rod whereby said T member and said pawls are actuated and thereby rotate the ratchet wheel.

3. A machine of the class described comprising a hopper having a directing plate to direct the cotton bolls, a revoluble feeding drum having lateral slots associated with said hopper and plate, a ratchet wheel rigidly associated with said feeding drum, pawls adapted to engage said ratchet wheel, a T member associated with said pawls, a connecting rod associated with said T member, and adjustable means associated with the connecting rod whereby the speed of the feeding drum may be varied.

4. A revoluble feed drum laterally slotted adapted to carry cotton bolls, a second revoluble drum having means on its lateral surface for engaging the cotton bolls conveyed by said feed drum and revolving in the same direction and in close proximity to said feed drum so as to check the advancing of cotton bolls by said feed drum, a revoluble cylinder having a laterally corrugated surface and revolving in a direction opposite to said drum, a directing plane interposed between said second drum and said cylinder, an adjustable plate associated with said cylinder, a predetermined space between said adjustable plate and cylinder, said adjustable plate and directing plane directing the motion of cotton bolls from said second drum to said corrugated cylinder, a revoluble saw cylinder revolving in the same direction as said corrugated cylinder and co-acting with the same, and a second revoluble cylinder having a plurality of projecting members making an angle of thirty degrees with the tangent of the lateral surface at the point of intersection, said members engaging the cylinder between the saws and thereby the cotton bolls previously not disintegrated are again forced against said adjustable plate and above said corrugated cylinder.

5. A revoluble saw cylinder adapted to carry seed cotton, a revoluble drum having means on its lateral surface co-acting with said saw cylinder and revolving in a direction opposite to said saw cylinder, said means on the surface of said drum being adapted to receive the seed cotton from said saw, a screen associated with the lower portion of said drum encircling half of its lateral surface and positioned in close proximity to said means on said drum and co-acting with the same, and a chute associated with said drum and screen into which the cleaned cotton is delivered.

6. A machine of the class described comprising a hopper, a revoluble feeding drum laterally slotted and adapted to receive the cotton bolls from said hopper, another drum revolving in the same direction as said feeding drum having means on the lateral surface to receive the cotton bolls fed by said feeding drum, a cylinder having a lateral corrugated surface and revolving in a direction opposite to said second drum, a directing plane interposed between said second drum and said cylinder, an adjustable plate associated with said cylinder and leaving a predetermined space between said adjustable plate and cylinder, a saw cylinder associated with said first cylinder and revolving in the same direction, a third cylinder having means projecting from its lateral surface and engaging said saw cylinder between the saws, a drum co-acting with said saw cylinder having means on its lateral surface to engage the seed cotton, a screen associated with said means on said last mentioned drum and encircling half of its lateral surface, a chute near said last mentioned drum for permitting cotton to pass, and a conveyer associated with said last mentioned drum and screen and above mentioned corrugated cylinder and adjustable plate to convey the impurities from the cotton.

In testimony whereof I have signed my name to this specification in the presence of two subscribing witnesses.

JOHN FRANKLIN WOLFINGER.

Witnesses:
  E. W. DAYTON,
  FREEMAN P. CORNISH.